(12) United States Patent
Liu et al.

(10) Patent No.: US 6,971,719 B2
(45) Date of Patent: Dec. 6, 2005

(54) CLUTCH ACTUATOR SURFACE APPARATUS AND METHOD

(75) Inventors: Jintao Liu, Windsor (CA); Harold Lee, Windsor (CA)

(73) Assignee: L & P Property Management Company, South Gate, CA (US)

(*) Notice: Subject to any disclaimer, the term of this patent is extended or adjusted under 35 U.S.C. 154(b) by 0 days.

(21) Appl. No.: 10/394,470

(22) Filed: Mar. 21, 2003

(65) Prior Publication Data
US 2004/0183349 A1    Sep. 23, 2004

(51) Int. Cl.[7] ................ A47C 3/025; F16C 67/00
(52) U.S. Cl. .................... 297/284.4; 192/223.2
(58) Field of Search ............. 297/284.4; 192/223.2

(56) References Cited

U.S. PATENT DOCUMENTS

| | | | |
|---|---|---|---|
| 823,971 A | 6/1906 | Remondy | |
| 3,631,951 A | 1/1972 | Quenneville | 192/8 C |
| 3,726,370 A | 4/1973 | Hubbard, Jr. | 192/8 C |
| 3,759,358 A | 9/1973 | Quenneville | 192/8 C |
| 3,796,292 A | 3/1974 | Harrison | 192/8 C |
| 3,876,184 A | 4/1975 | Eudy | 254/150 R |
| 4,014,422 A | 3/1977 | Morishita | 192/67 R |
| 4,316,631 A | 2/1982 | Lenz et al. | 297/284 |
| 4,354,709 A | 10/1982 | Schuster | 297/284 |
| 4,494,709 A | 1/1985 | Takada | 242/107.6 |
| 4,561,606 A | 12/1985 | Sakakibara et al. | 242/107 |
| 4,614,257 A | 9/1986 | Harada et al. | 192/8 C |
| 4,778,138 A | 10/1988 | Yamada | 248/421 |
| 4,786,110 A | 11/1988 | Mahling et al. | 297/362 |
| 4,817,771 A | 4/1989 | Iten | 192/16 |
| 5,010,780 A | 4/1991 | Hatfield | 74/501.5 R |
| 5,042,628 A | 8/1991 | Malecha | |
| 5,050,930 A | 9/1991 | Schuster et al. | 257/284 |
| 5,080,434 A | 1/1992 | Locher | 297/301 |
| 5,087,098 A * | 2/1992 | Ishizuka | 297/284.4 |
| 5,099,972 A | 3/1992 | Ouchi | |
| 5,186,412 A | 2/1993 | Park | 242/245 |
| 5,197,780 A | 3/1993 | Coughlin | 297/284.7 |
| 5,211,368 A | 5/1993 | Kitamura | 248/292.1 |
| 5,217,278 A | 6/1993 | Harrison et al. | 297/284.7 |
| 5,248,017 A | 9/1993 | Schwarzbich | 192/8 R |
| 5,382,076 A | 1/1995 | Scheck et al. | 297/354.12 |
| 5,397,164 A | 3/1995 | Schuster et al. | 297/284.1 |
| 5,449,219 A | 9/1995 | Hay et al. | 297/284.4 |
| 5,522,488 A | 6/1996 | Schwarzbich | 192/8 R |

(Continued)

FOREIGN PATENT DOCUMENTS

DE   29 47 472   8/1980   ............ B60N 1/00

(Continued)

Primary Examiner—Peter M. Cuomo
Assistant Examiner—Sarah C. Burnham
(74) Attorney, Agent, or Firm—Husch & Eppenberger, LLC; Grant D. Kang (57) ABSTRACT

A clutch actuator has a housing with a load bearing element disposed within it. A force application element disposed within the housing applies force to the load bearing element. A stop assembly includes a retaining stopper between the load bearing element and the force application element. The stopper is dimensioned relative to a retainer and to the load bearing element to stop movement of said load bearing element relative to said retainer in the absence of a force application, and the stopper is dimensioned relative to said retainer and to said load bearing element to allow movement of said load bearing element relative to said retainer when force is applied against the load or when is force is released toward the load. One surface of the retainer, the stopper or the load bearing element is textured.

23 Claims, 7 Drawing Sheets

U.S. PATENT DOCUMENTS

| | | | |
|---|---|---|---|
| 5,567,010 A | 10/1996 | Sparks | 297/284.4 |
| 5,567,011 A | 10/1996 | Sessini | 297/284.7 |
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,651,584 A | 7/1997 | Chenot et al. | 297/284.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,842,659 A | 12/1998 | Ligon, Sr. et al. | 242/394.1 |
| 5,865,285 A | 2/1999 | Minkenberg et al. | 192/15 |
| 6,039,397 A | 3/2000 | Ginat | |
| 6,045,185 A | 4/2000 | Ligon, Sr. et al. | 297/284.4 |
| 6,050,641 A | 4/2000 | Benson | 297/284.4 |
| 6,095,302 A | 8/2000 | Cheng et al. | |
| 6,152,531 A | 11/2000 | Deceuninck | |
| 6,158,300 A | 12/2000 | Klingler | 74/526 |
| 6,178,838 B1 | 1/2001 | Schwarzbich | 74/143 |
| 6,179,384 B1 | 1/2001 | DeKraker et al. | |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,334,651 B1 | 1/2002 | Duan et al. | |
| 6,345,549 B1 | 2/2002 | Lance | 74/500.5 |
| 6,520,580 B1 * | 2/2003 | Hong | 297/284.4 |
| 2002/0043849 A1 | 4/2002 | Denis | 297/344.1 |
| 2003/0062749 A1 * | 4/2003 | Liu et al. | 297/284.4 |
| 2004/0080196 A1 * | 4/2004 | Kopetzky et al. | 297/284.4 |

FOREIGN PATENT DOCUMENTS

| | | | | |
|---|---|---|---|---|
| EP | 0 006 840 B1 | 2/1982 | | A47C 23/00 |
| EP | 0 322 535 A1 | 7/1989 | | A47C 7/46 |
| EP | 0 751 030 A1 | 1/1997 | | B60N 2/22 |
| EP | 0 751 032 B1 | 1/2001 | | B60N 2/22 |
| EP | 0 751 031 B1 | 9/2001 | | B60N 2/22 |
| EP | 0 885 164 B1 | 7/2002 | | B65H 75/30 |
| FR | 2 809 999 A1 | 12/2001 | | B60N 2/16 |
| JP | 58170638 | * 10/1983 | | B60N 1/06 |
| WO | WO 99/05000 | 2/1999 | | B60N 2/06 |
| WO | WO 02/11584 | 2/2002 | | A47C 8/46 |

* cited by examiner

CLUTCH ACTUATOR SURFACE APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field actuators for actuating mechanical devices, especially traction devices such as Bowden cables used to move ergonomic supports in seats, particularly automobile seats.

2. Related Art

Many mechanical devices need to be moved to a user selected position and then held there against a force that is biased to return the device to its original position. Such devices are commonly used for ergonomic supports in seating, especially lumbar supports for automobile seats. Lumbar supports exert a comfortable force against the lumbar spine of a seat occupant. This force is applied mechanically through a wide variety of configurations including arching, bending, tightening, extending or otherwise moving a pressure surface. Pressure surfaces are of an equally wide variety including straps, paddles, "baskets," arching surfaces, bowed surfaces and so forth. These devices must allow the user to select a desired position for the pressure surface, and thereafter hold that position after the user has released whatever device and linkage has been used to move the pressure surface to the selected position. The linkages are of a wide variety including rods, levers, springs, cables, and especially coaxial traction cables such as Bowden cables. The linkage, for example a Bowden cable, has a connection to the lumbar support at one end and a connection to an actuator at the other end. The actuator is positioned where the user may operate it, typically at the edge of the seat.

There is a great variety of actuator structures used for these purposes, both mechanical and electrical. They share in common the function of moving the pressure surface to a selected position, and then holding the pressure surface in that position against a force exerted by the seat occupant's weight. That force is biased towards returning the pressure surface to its original position, which is usually flat. The most common linkage, the Bowden cable, has a flexible conduit, also called a "sleeve" or "sheath," through which runs a coaxially sliding wire. Actuators have a seat for the end of the sleeve and seat for the end of the wire. The opposite ends of the wire and sleeve are connected to different portions of the lumbar or other ergonomic support, such that pulling the wire through the sleeve moves the pressure surface to the desired position. Accordingly, the most commonly used actuators are designed to pull a Bowden cable wire through a Bowden cable sleeve. The actuators must exert the force necessary to pull the wire through the sleeve to actuate the lumbar support. They must also hold the wire against the return force of the passenger's weight on the lumbar support pulling the wire back into the sleeve. In addition the actuators must also be able to release the holding force from the wire so that the user may return the ergonomic device to its original position or to another selected position.

U.S. Pat. Nos. 5,397,164 and 6,334,651 B1 are incorporated herein by reference.

Actuators achieve these necessary functions of movement, holding and release through a variety of mechanisms. Electronically powered actuators frequently use gears connected to take up wheels or drums for pulling the Bowden cable wire. Manual actuators may also use gears and take up drums, but more typically include a brake, ratchet or clutch. Brakes, ratchets and clutches are powered by levers or hand wheels turned by the users hand. Common to all of the mechanical devices and some of the electrical devices is the use of some type of friction surface. Whatever component takes up the Bowden cable wire must move past a friction surface, engage the friction surface to hold a selected position, and then release from the friction surface so that the component to which the wire is attached may return. The material of which these actuators are built, especially clutch type mechanical actuators, are typically plastic and sintered metal with steel bearings. Clutch actuators involve a cam and bearing arrangement in which the bearing floats with actuator movement to a selected position. The bearing locks between a cam and an enclosing ring or race to hold a selected position, and is thereafter releasable for a return movement.

Hitherto, manual clutch actuators have had problems with slippage and low durability in the interaction between plastic, sintered metal, and steel components. There is a need for an actuator, particularly a manual clutch actuator, that does not slip and does not wear out.

SUMMARY OF THE INVENTION

The present invention is a novel actuator having a friction surface. In one preferred embodiment, the actuator is a manual clutch type actuator. The actuator has a housing with a seat for a Bowden cable sleeve. Inside the housing is a take up wheel or drum for putting tractive force on a Bowden cable wire and pulling it from a Bowden cable sleeve by taking the wire up on the wheel. The wheel is coaxial with and fixed to a hub having a plurality of cam shaped surfaces. The hub is encircled by a ring. The cam shaped surfaces on the hub, when assembled with the ring, form constricting channels. Bearings are disposed within the constricting channels. In one preferred embodiment, the bearings are roller bearings made out of steel. Also disposed within the constricting channels are cylindrical rubber springs. The ring is fixedly attached to the housing, which is to be fixedly mounted to a seat frame. The hub and take up drum are linked to a lever or handwheel with which the user turns the actuator. Particularly, the lever or handwheel is connected with a disk that is coaxial with and axially adjacent to the hub. The disk has axially projecting fingers that extend into the constricting channels between the circular hub and its enclosing ring. These fingers are disposed to put rotational pressure on the steel rollers adjacent to them. The constricting channels are separated by stops which are an integral part of the hub. The fingers are also disposed to abut the hub stops and, when turned, exert rotational pressure on them. Thus each finger abuts a hub stop on one side and a steel roller on the other side. Each steel roller is separated from its adjacent hub stop by the rubber cylindrical spring. Each steel roller is abutted on either side by the disk finger and the rubber spring. Each rubber spring is abutted on either side by the steel roller and the hub stop. Each hub stop is abutted on either side by the rubber spring and the next finger extension of the disk.

In operation, the manual clutch actuator performs the functions required of it: movement with force, position holding and release. Movement with force is achieved by the user turning the lever or handwheel, which turns the disk, which revolves the fingers to exert force against the abutting hub stops. The entire hub thereby moves in a first direction, which direction turns the attached take up drum, which takes up the Bowden cable wire and exerts tractive force on it. The wire then moves the lumbar support on its other end.

When the user releases the lever or handwheel, the user's weight against the pressure surface of the lumbar support will put force on the Bowden cable wire tending to draw it back into the sleeve. The pressure surface and Bowden cable wire are held stopped against this force by the action of the clutch in the actuator. That is, the configuration of the hub with the enclosing ring forms constricting channels which become more narrow at one end. The steel roller disposed within the constriction channel in sized so that it may move freely in the wide end of the channel, but cannot fit in the narrow end of the channel, causing it to jam or wedge when moved towards the narrow end of constricting channel. The return force or load on the hub exerted by the Bowden cable wire rotates the hub so that the steel roller is biased towards the narrow end of the constricting channel. The roller jams there, preventing further rotation of the hub which holds the wire. Consequently the lumbar support pressure surface connected to the wire is held in the selected position.

In order to release the held wire and pressure surface, the user turns the lever or handwheel in a direction opposite the first direction in which he turned it. This direction is the same direction torsionally as the load. The disk fingers linked to the lever push the steel rollers towards the rubber springs, compressing the springs and advancing the steel rollers into the wider part of the constricting channels so that the hub may rotate freely relative to the ring. This releasing action allows the actuator to complete its final necessary action, releasing the clutch to turn so that the lumbar support can return to its original position.

It is apparent that the function of holding the selected position against the load is achieved by the frictional action of the steel roller between the inner surface of the fixed ring and the outer cam surface of the rotating hub. In order that the selected position to be accurately held and that there be a satisfying immediacy to the holding of that position, the frictional relationship between the steel roller, ring and hub must not slip. Additionally, repeated actions of holding and releasing should not wear down the surfaces of the ring or hub to create a groove or indentation and should not wear down the surface of the steel rollers to flatten them. Such wear leads to increased slippage and failure of the device to accurately hold the selected position.

The present invention incorporates a novel friction surface to the frictional relationship between the ring, roller and hub. The frictional surface is a textured surface. In one preferred embodiment, grooves are machined into the inner surface of the ring. One size groove is circumferential and another size groove is axial. These grooves ensure a tight, non-slip lock with the steel roller. These grooves also clearly reduce wear on all components and increase the durability of the clutch actuator.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
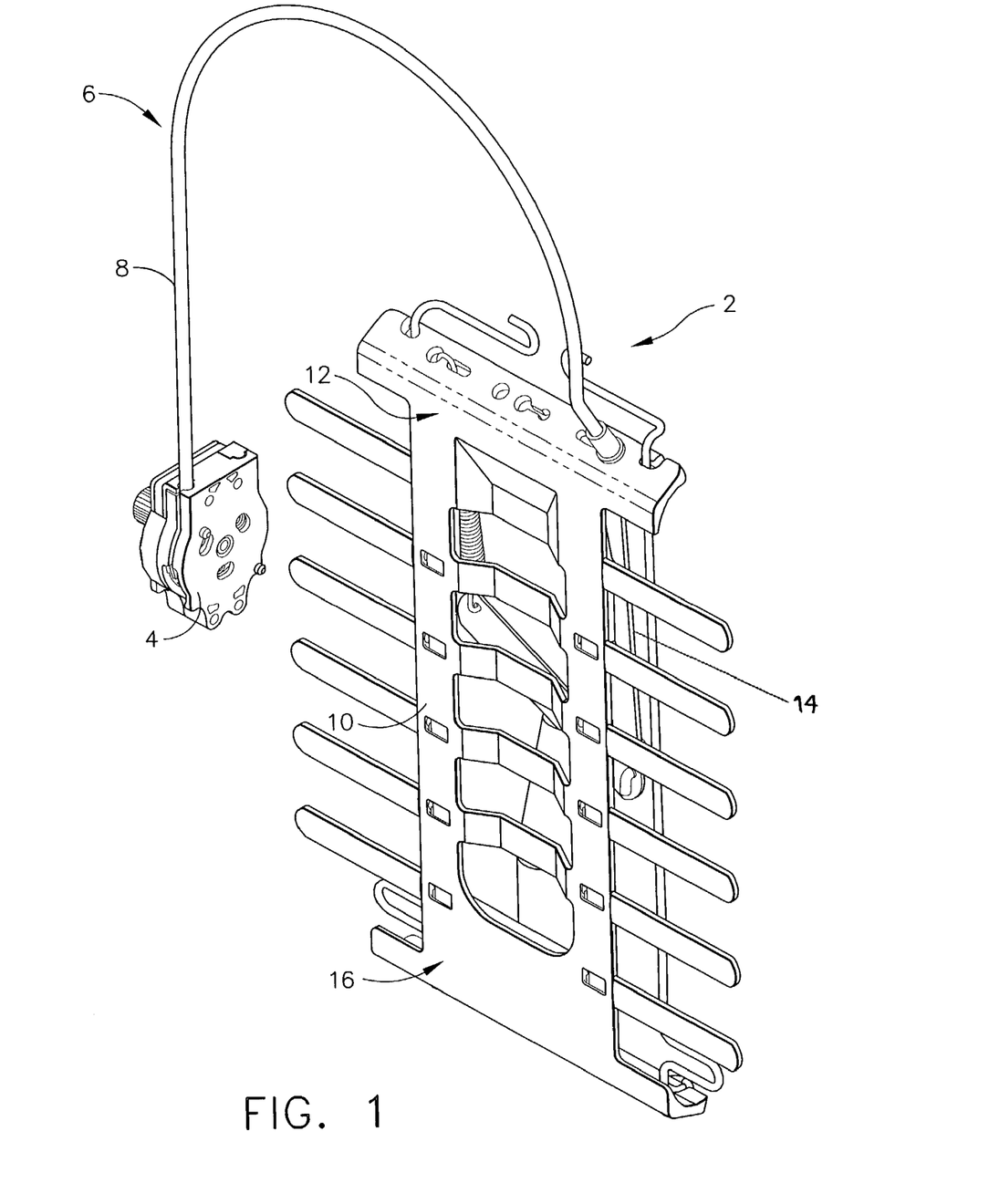
FIG. 1 is a lumbar support with a manual actuator.

Referring to the accompanying drawings in which like reference numbers indicate like elements, FIG. 1 depicts an ergonomic support, which in FIG. 1 is a lumbar support 2, for an automobile seat. Movement of the lumbar support 2 is achieved by a manual actuator 4 which is linked to the lumbar support by Bowden cable 6. Bowden cable 6 has a sleeve 8 which is attached to a first portion 12 of the moveable pressure surface 10 of the lumbar support 2. Inside the Bowden cable sleeve and disposed to slide axially through it is a Bowden cable wire 14 attached to another portion 16 of the moving pressure surface of the lumbar support 2. The actuator 4 puts a tractive force on the Bowden cable wire 14 pulling it through the Bowden cable sleeve 8. This moves the second portion 16 of the moveable pressure surface of the lumbar support towards the first portion 12 of the moveable pressure surface of the lumbar support, bowing it into an arch shape that gives the seat occupant lumbar support.

Figure 2:
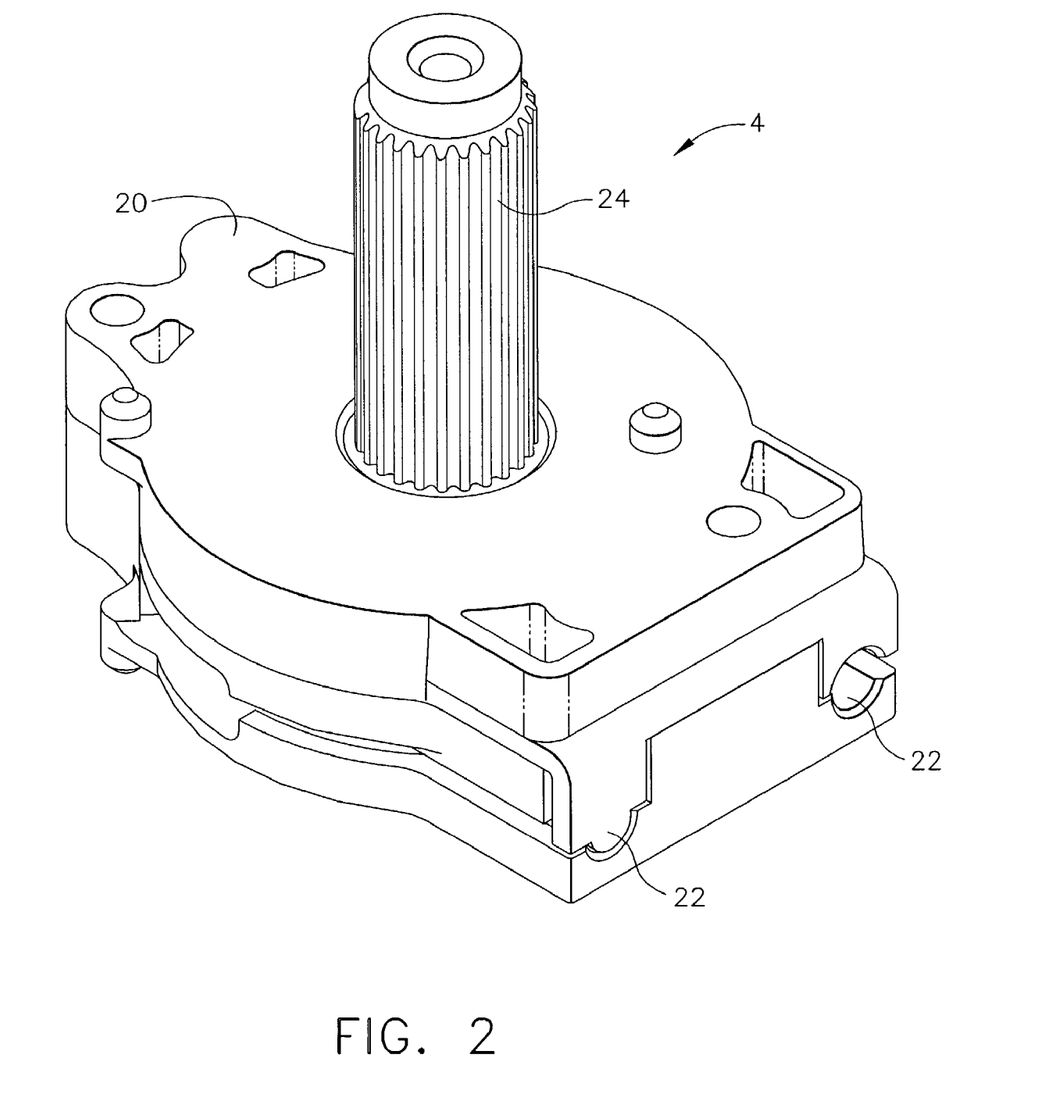
FIG. 2 is a perspective view of a manual clutch actuator, assembled.

FIG. 2 is a perspective view of an assembled clutch actuator 4. FIG. 2 depicts one of many possible housing configurations enclosing the essential components of an overrunning clutch type manual actuator. Housing 20 includes two optional seats 22 for a sleeve of a traction cable such as a Bowden cable. Only one seat will be used in assembly. Axle 24 turns the clutch. It will be assembled with a lever or handwheel (not shown).

Figure 3:
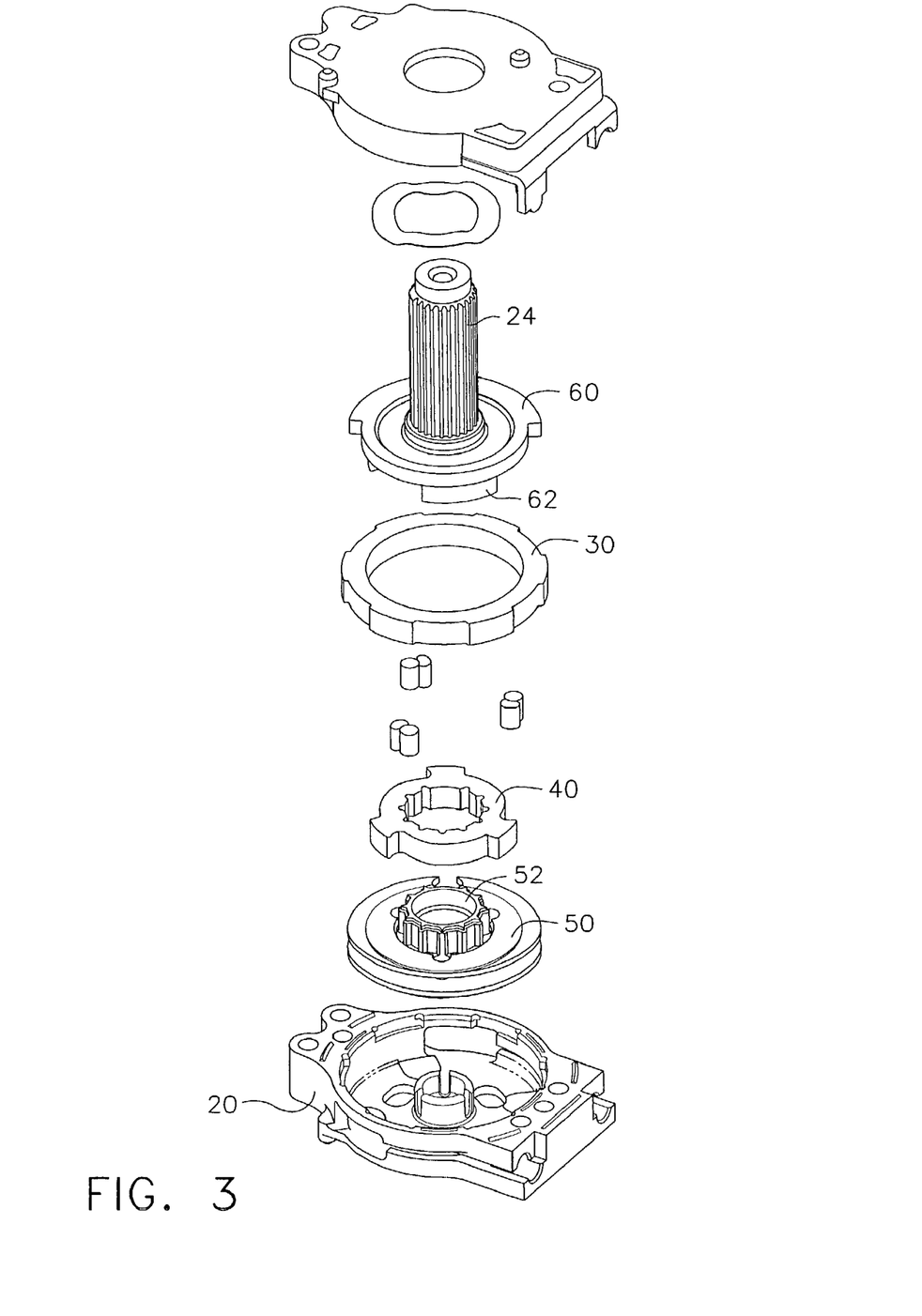
FIG. 3 is an exploded view of a manual clutch actuator.
Figure 4:
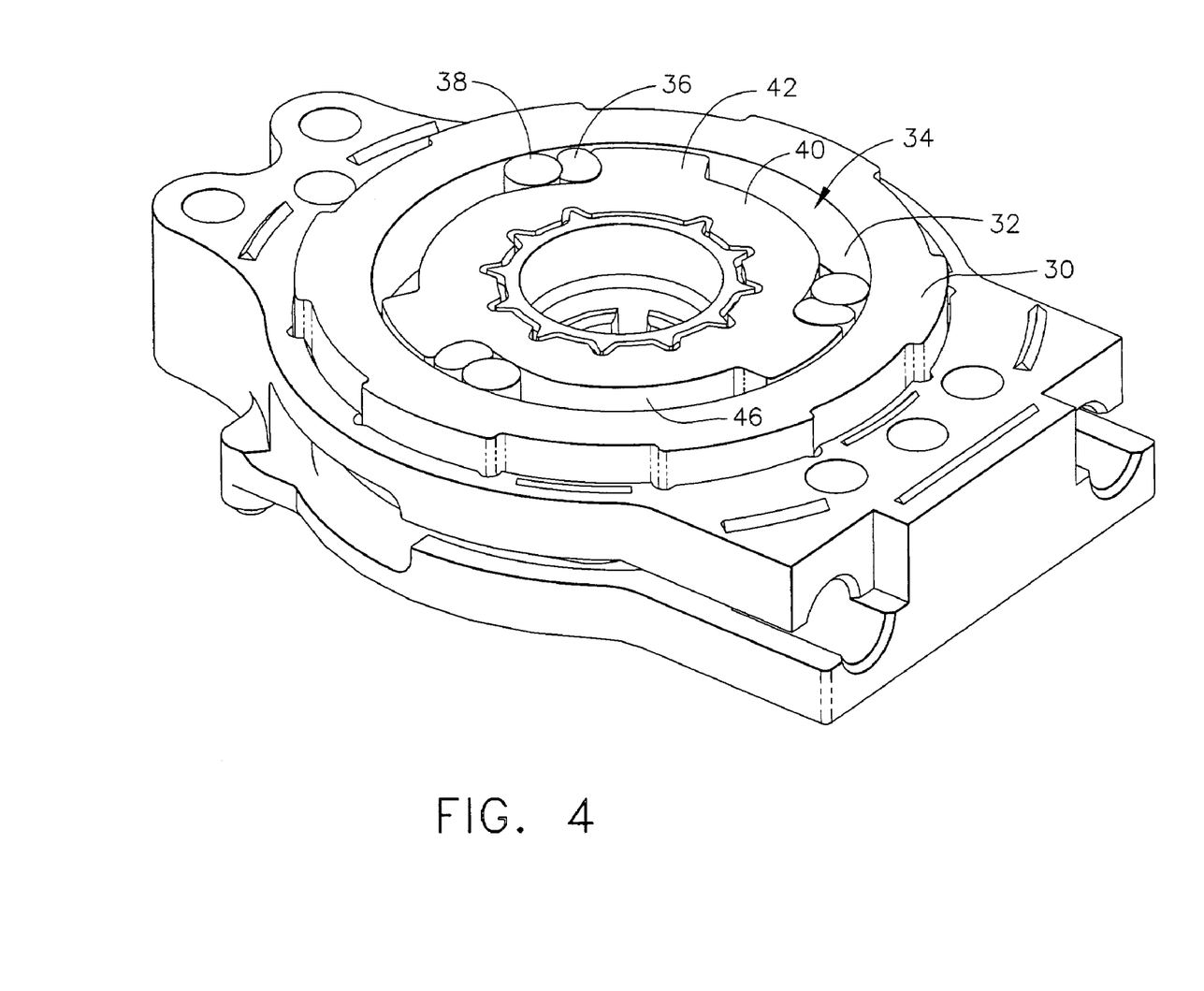
FIG. 4 is a perspective view of a partially assembled manual clutch actuator.
Figure 5:
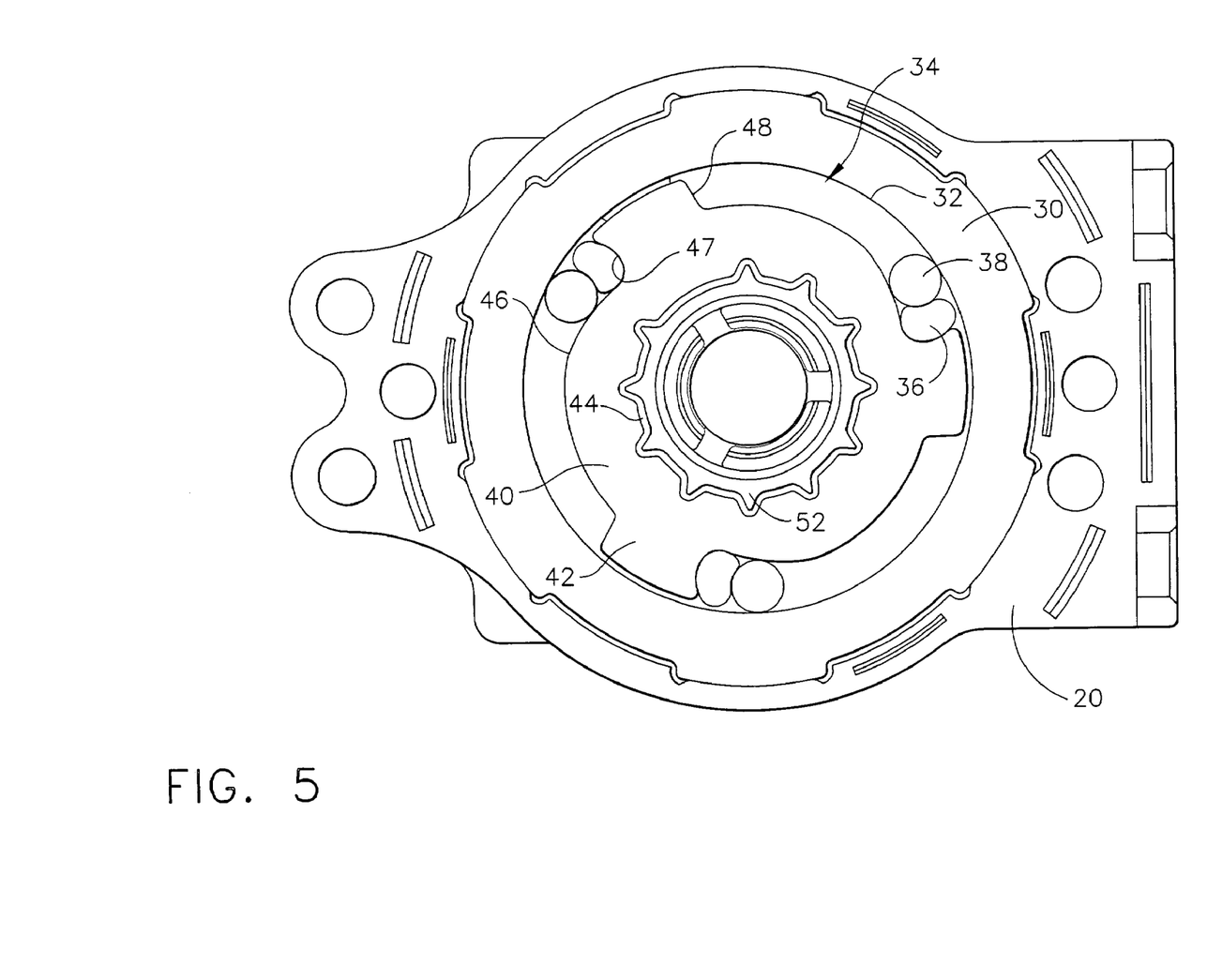
FIG. 5 is a top view of a partially assembled manual clutch actuator.

FIGS. 3, 4 and 5 are exploded, perspective and top views of the clutch actuator of the present invention. Ring 30 is installed in housing 20 and fixedly attached to it. Hub 40 is assembled inside ring 30 and coaxial with it. In the depicted embodiment, hub 40 has three hub stops 42. Hub stops 42 are dimensioned to closely cooperate with an inner surface 32 of ring 30. In many embodiments, hub 40 is fabricated from sintered metal.

Hub 40 has an interface 44 which is attached during assembly to an extension 52 of a Bowden cable wire take up drum 50. Seat 22 in housing 20 holds a Bowden cable sleeve end against the tension to be applied by the actuator 4. From the sleeve end, a Bowden cable wire extends through housing 20 to where it is seated on take up drum 50. Take up drum 50 has an extension 52 which interlocks with the interface 44 of hub 40. Accordingly, rotation of hub 40 turns take up drum 50. When the rotation of hub 40 and drum 50 is in a first direction, traction is applied to the Bowden cable wire, pulling it from the Bowden cable sleeve, which will have an actuating effect on the lumbar support at the other end of the Bowden cable.

Assembled on top of the ring 30 and hub 40 is disk 60. When a user turns a handwheel or lever (not shown) the action will turn axle 24. Turning axle 24 turns disk 60. Disk 60 has downward projecting "fingers" or extensions 62. Fingers 62 project downward onto the plane of ring 30 and hub 40 in order to interact with them and transmit force exerted by the user on the lever or handwheel and transferred through the axle 24 to disk 60.

The assembly of ring 30 and hub 40 creates between them constricting channels 34. The constricting channels 34 are each bounded by the inner surface 32 of ring 30, the outer surface 46 of hub 40, the releasing face 47 of hub stop 42, and the tensioning face 48 of another hub stop 42. Outer surface 46 of hub 40 is eccentric or cam shaped. In alternative embodiments, outer surface 46 of hub 40 may be perfectly circular, and assembled with a ring 30 whose inner surface 32 is eccentric or cam shaped. In either case, the assembly of ring 30 and hub 40 must define a constricting channel 34. In the case of bi-directional clutches, the constricting channel may be narrowed at both ends and wider in the middle. However, in the depicted embodiment, each constricting channel 34 is narrower towards a tensioning face 48 of a hub stop 42, and wider towards a releasing face 47 of another hub stop 42.

In assembly, a rubber grommet 36 is disposed immediately against the releasing face 47 of hub stop 42, to serve as a spring. Alternatively, other types of springs may be used. In assembly, a bearing 38 is disposed immediately adjacent to rubber grommet 36. Bearing 38 may be any known shape or configuration, however, in the depicted embodiment, bearing 38 is a steel roller. The steel roller 38 is dimensioned such that its diameter cannot simultaneously touch inner surface 32 of ring 30 and outer surface 46 of hub 40 when roller 38 is in the wider portion of the constricting channel 34 closer to releasing face 47 of hub stop 42. Steel roller 38 is also dimensioned such that it cannot fit between inner surface 32 and outer surface 46 at the narrow end of the constricting channel 34 closer to the tensioning face 48 of another hub stop 42. It is apparent, then, that movement of hub 40 relative to ring 30 in a first direction, which is clockwise in the embodiment shown in FIG. 5, will cause steel roller 38 to wedge or jam in between inner surface 32 and outer surface 46. This jamming stops and holds the relative movement of hub 40 and ring 30. Because the Bowden cable wire is fixed to wire drum 50 and wire drum 50 is attached to hub 40 such that drum 50 can only move in unison with hub 40, the stopping of hub 40 by the jamming of steel roller 38 will hold the assembly and wire against further clockwise rotation. This of course holds the tension of the assembly on the Bowden cable wire against the clockwise torque exerted on the assembly by the weight of a seat occupant pushing against the pressure surface of the lumbar support. In this manner, a user selected position is held in place.

It is apparent that the components described herein maybe reversely assembled in a mirror image fashion so that they hold against a counter clockwise torque. In assembly, left and right hand seat versions of the actuator may be easily assembled by simply turning the hub over, and seating the traction cable sleeve in one or the other seat 22.

In operation, the actuator has two other functions to perform in addition to stopping rotation in order to hold a selected position. The first of these is tensioning the actuator in order to pull the Bowden cable wire out of the Bowden cable sleeve and exert tractive force on the lumbar support at the other end of the Bowden cable. The other function is to release tension. Releasing the wedging stop of the steel roller and allowing the hub to counter rotate, releases the tension on the Bowden cable, allowing the wire to retract into the cable and thereby allowing the pressure surface of the lumbar support to return to the original, flatter position.

The tensioning function is as follows. The user turns the lever or handwheel (not shown) thereby turning axle 24 in second direction. In the embodiment depicted in FIG. 5, the second direction is counter clockwise. Turning the axle 24 turns the disk 60 and consequently turns the disk fingers 62. Because disk fingers 62 extend downward into the constricting channels 34, counterclockwise rotation of the fingers 62 brings them into contact with the tensioning face 48 of each hub stop 42. The fingers 62 drive the hub in the second direction, counter clockwise in FIG. 5, which causes the narrow end of the constricting channel to recede away from steel rollers 38. The steel rollers 38 are thereby released, have room to move in the wider portion of constricting channels 34, and may rotate along with hub stops 42 in the second, counter clockwise direction. When the user has moved the assembly and, thru it, the lumbar support, to a position she finds comfortable, she releases manual pressure on the lever and axle 24. When the force being exerted on the disk finger 62 in the second, counter clockwise direction stops, the return force of the Bowden cable wire which is exerted on hub 40 through wire take up drum 50, is received as torque by the assembly in the clockwise first direction. Rubber grommet springs 36 expand and exert a bias in the second, counterclockwise direction on steel rollers 38. The combination of these two effects moves steel roller 38 towards the narrow end of constricting channel 34 where it wedges or jams. The clutch is stopped, and the selected position held.

In order to return the lumbar support to its original, flatter position, the clutch assembly need only release the stopping action of the steel roller 38. Accordingly, the user may turn axle 24 in the first, clockwise direction. This causes fingers 62 to push steel rollers 38 in the first, clockwise direction and into the wider portion of constricting channel 34. This releases hub 40 to move relative to ring 30 and consequently allows hub 40 and the attached Bowden cable wire take-up drum 50 to rotate relative to the ring 30. This freed rotation allows the Bowden cable wire to be drawn back into the Bowden cable sleeve, in turn allowing the lumbar support to return to its original, flatter position.

It will be immediately apparent to those of skill in the art that for the clutch actuator to give a feeling of immediate response and precision to its user, the tolerances between the outer surface 46 of hub 40, the inner surface 32 of ring 30 and the steel roller 38, must be relatively small. Stated another way, upon the release of user applied tension in the second, counter clockwise direction—the tensioning direction—steel roller 38 cannot be allowed to rotate any appreciable distance before it jams and stops the assembly in the selected position. If the steel roller fails to jam immediately the user will feel an undesirable slippage of the assembly. In addition to the unsatisfactory feel of such slippage, slippage also causes the need for a readjustment of the assembly and lumbar support to return to the desired position.

Even when the tolerances between the inner surface 32 of ring 30 and the outer surface 46 of hub 40 and the steel roller 38 are kept reasonably close, if all three surfaces are smooth, some slippage is likely to occur, at least in those lumbar support positions where tension is highest. Non-slipping interaction between the surfaces is needed.

In addition to the possibility of initial slippage, in the lifetime of actuator use the repeated interaction of the surfaces over time creates wear, exacerbating any slippage problem. Steel roller faces may be flattened by repeated use. Inner surface 32 of ring 30 may be worn or eroded, thereby extending the length of the wider portion of constricting channel 32 and wearing gaps between the interacting surfaces, increasing the occurrence and degree of slippage. Finally, the outer surface 46 of hub 40, especially in those embodiments wherein hub 40 is made of sintered metal, may be likewise worn so that the desired curvature of the cam surface 46 is lost, again producing increased incidence and degree of slippage. A more durable interaction of surfaces would be desirable.

Figure 6:
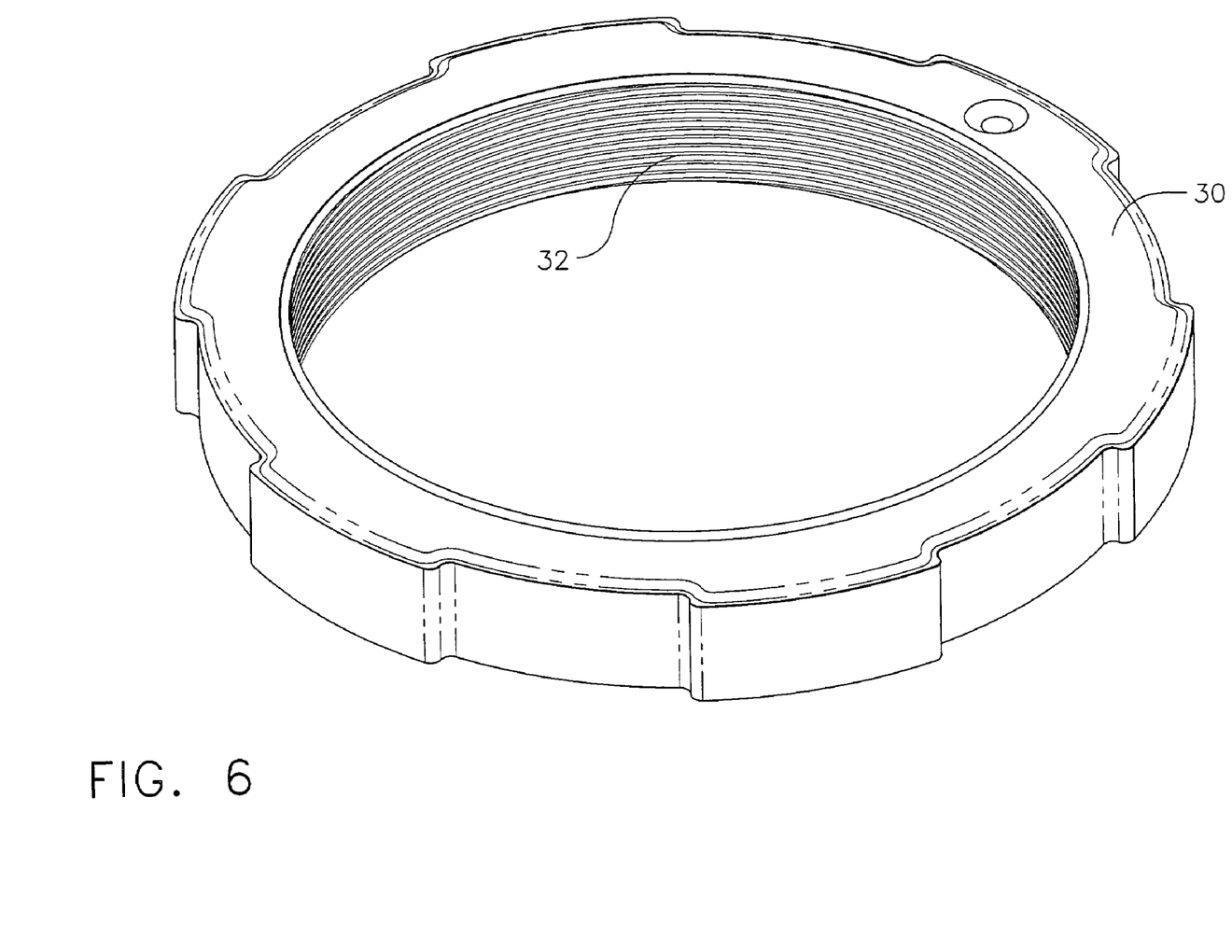
FIG. 6 is a perspective view of the ring of the manual clutch actuator.

FIG. 6 is a perspective view of ring 30. Inner surface 32 has been textured. Texturing the surface of inner surface 32 of ring 30 increases the frictional co-efficient of inner surface 32 in its interaction with steel roller 38. Early in the life cycle of the actuator, the textured surface 32 promotes a quicker "grab" of the roller 38, thereby decreasing slippage. The textured surface is also more resistant to wear, so that the degree and incidence of slippage does not increase over the lifetime of the actuator regardless of repeated usage. As seen in FIG. 6, the texture extends circumferentially along the inner surface 32.

Figure 7:
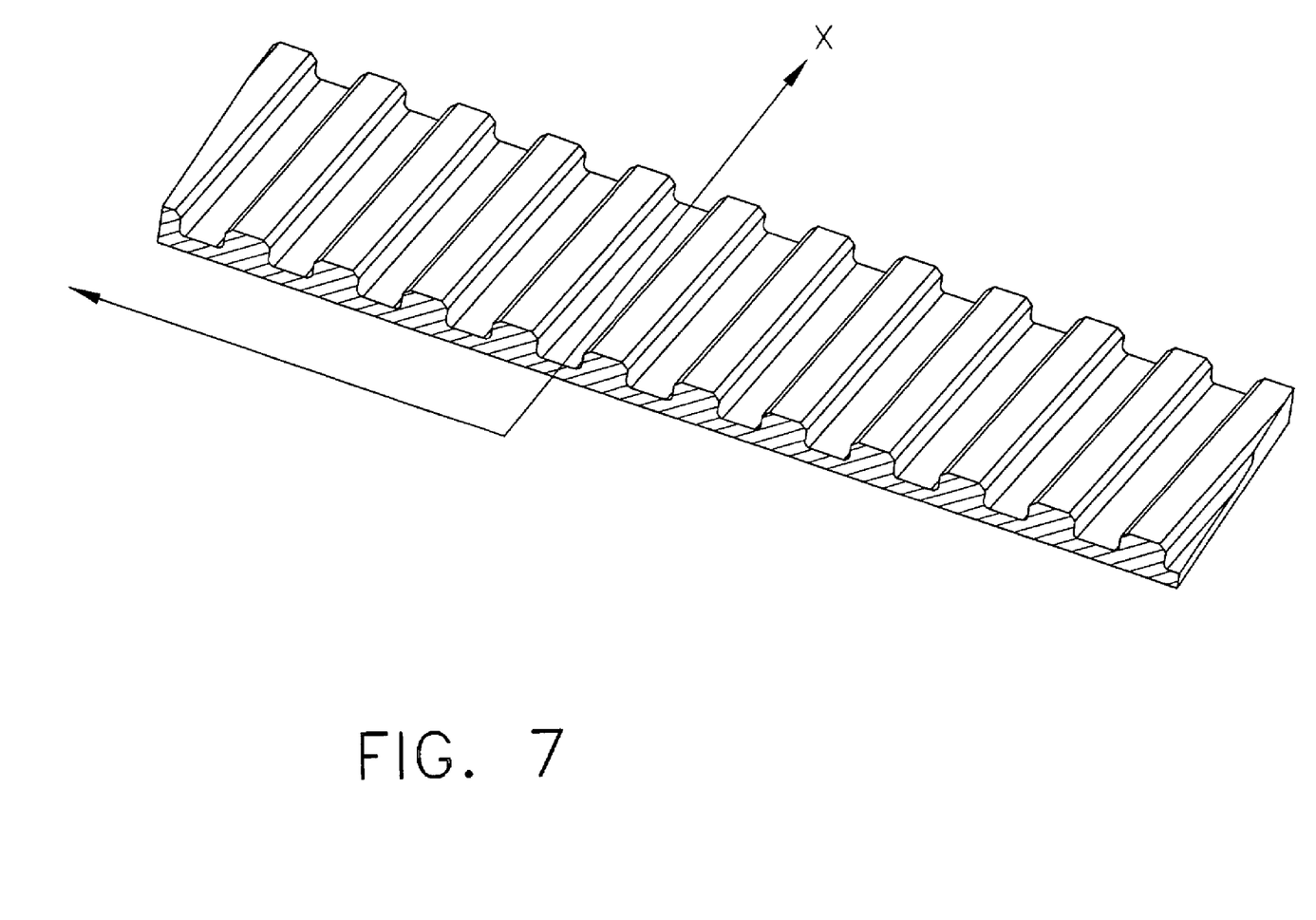
FIG. 7 is a close up of the textured surface of the ring of the manual clutch actuator.

FIG. 7 is a close-up depiction of one embodiment of the texturing of surface 32. In the depicted embodiment, the inner surface 32 of ring 30 has been machined with a helical groove. FIG. 7 is a close-up section of inner surface 32 showing many grooves. Axis X in FIG. 7 shows the direction of these grooves. In the depicted embodiment, the many grooves are actually the same groove, because they have been machined in a helical fashion. Alternatively, several interlocking helical grooves or separate grooves may be used. In the depicted embodiment, the grooves are one to three microns deep and one to three microns wide. A preferable range may include about 1.0 to 3.5 microns, with a most preferred range of about 1.6 to 2.6 microns.

In one embodiment the inner surface 32 is hardened to a hardness of 30 Hardness Rockwell "C" Scale with a micro hardness of about 55 as measured according to ASTM E140-67. A preferable range may include about 26 to 46 Hardness Rockwell "C" Scale, with a most preferred range of 30 to 41 Hardness Rockwell "C" Scale. Micro hardness may be from about 40 to 70 as measured according to ASTM E140-67.

Additionally further texturing may be desirable. Grooves, ridges, or other texturing may be machined in a direction co-axial with the ring 30, along the Y axis in FIG. 7. Such co-axial grooves would then be perpendicular to the direction of travel of hub 40 and roller bearings 38. In one embodiment, the dimensions of such a micro texture would be around 0.2 microns. A preferable range may be about 0.1 to 0.3 microns.

Other embodiments within the scope of the present invention may place 1 to 3 micron grooves in the co-axial direction and 0.1 to 0.3 micron grooves in the circular direction. Other As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A clutch actuator for an ergonomic support assembly having a load comprising:
    a housing;
    a load bearing element disposed within said housing to be attachable to the load;
    means for adjusting force to a portion of said load bearing element relative to the load;
    a stop assembly having a retainer fixed within said housing, said retainer retaining a stopper between a portion of said load bearing element and a portion of said force adjusting means, said stopper being dimensioned relative to said retainer and to said load bearing element to stop movement of said load bearing element relative to said retainer in the absence of a force application, and said stopper being dimensioned relative to said retainer and to said load bearing element to allow movement of said load bearing element relative to said retainer when said force adjusting means applies said force against the load and releases said force toward the load;
    wherein at least one surface of said retainer, said stopper and said portion of said load bearing element is textured to include at lease one groove; and
    a traction linkage in operative engagement with said load bearing element and said housing at a first end, and said traction linkage having a second end in operative engagement with the ergonomic support assembly.

2. The clutch actuator of claim 1, further comprising a spring disposed between said stopper and said portion of said load bearing element.

3. The clutch actuator of claim 1, wherein said retainer is a metal ring in said housing, said ring having an axis and having an inner surface engaged with said stopper.

4. The clutch actuator of claim 3, wherein said inner surface of said ring has a hardness within a range of about 30–41 Hardness Rockwell "C" Scale.

5. The clutch actuator of claim 3, wherein said inner surface of said ring has a micro-hardness with a range of about 40 to 70.

6. The clutch actuator of claim 1, wherein said force adjusting means is comprised of an axle disposed in said housing, said axle comprising at least one axle extension.

7. The clutch actuator of claim 6, said load bearing element comprising a drum rotatably disposed within said housing and said stopper being interposed between said axle and said drum in said housing to transfer force applied to said axle to said drum through said at least one axle extension.

8. The clutch actuator of claim 1, further comprising at least one supplementary groove, said supplementary grooves being aligned differently than said groove.

9. The clutch actuator of claim 8, wherein said supplementary groove is substantially parallel to said axis of said ring.

10. The clutch actuator of claim 8, wherein said supplementary groove is about 0.1 to 0.3 microns wide.

11. The clutch actuator of claim 8, wherein said supplementary groove is about 0.1 to 0.3 microns deep.

12. The clutch actuator of claim 1, wherein said at least one groove is a substantially perpendicular groove relative to said axis of said ring.

13. The clutch actuator of claim 1, wherein said at least one groove is a single helical groove.

14. The clutch actuator of claim 1, wherein said at least one groove has a depth between about one to three microns.

15. The clutch actuator of claim 1, wherein said at least one groove has width between about one to three microns.

16. An actuator for a tractive element comprising:
   a housing having a seat for a traction cable sleeve;
   a drum rotatably disposed within said housing such that said drum may take up a traction cable wire from the traction cable sleeve;
   an axle disposed in said housing to transfer force applied to said axle to said drum via at least one axle extension;
   a clutch interposed between said axle and said drum in said housing, said clutch comprising:
      a ring having a textured inner surface, said texture comprising at least one groove;
      a hub encircled by said ring, said hub having hub stops and having an eccentric outer surface between said hub stops;
      said outer surface of said hub and said inner surface of said ring forming a constricting channel;
      at least one spring disposed in a wide portion of said constricting channel;
   said at least one axle extension being disposed in a narrow portion of said constricting channels;
      at least one bearing disposed in said constricting channel between said spring and said axle extensions, said bearing having a diameter greater than said narrow portion of said constricting channel and less than said wide portion of said constricting channel;
   whereby, rotation of said axle in a first direction exerts tractive force on the traction cable wire, release of said axle holds said traction cable wire in a selected position, and rotation of said axle in a second direction releases said tractive force.

17. The clutch actuator of claim 16, wherein said at least one groove extends circumferentially about said inner surface.

18. The clutch actuator of claim 16, wherein said at least one groove is helical.

19. A clutch actuator for applying traction to an ergonomic support comprising:
   a housing adaptable for engagement with a traction cable;
   means for applying torque against a load on the traction cable;
   means for holding the traction cable against the load;
   means for releasing the load on the traction cable;
   a textured friction surface on said holding means, wherein said texturing includes at least one groove.

20. The clutch actuator of claim 19, wherein said torque applying means comprises a drum rotatably disposed within said housing and an axle disposed in said housing to transfer force applied to said axle to said drum via at least one axle extension.

21. The clutch actuator of claim 20, wherein said holding means comprises a ring and a hub encircled by said ring, said hub having hub stops and having an eccentric outer surface between said hub stops, said outer surface of said hub and said inner surface of said ring forming a constricting channel, wherein at least one spring is disposed in a wide portion of said constricting channel, said axle extension being disposed in a narrow portion of said constricting channel, and at least one bearing is disposed in said constricting channel between said spring and said axle extensions, said bearing having a diameter greater than said narrow portion of said constricting channel and less than said wide portion of said constricting channel.

22. The clutch actuator of claim 21, wherein rotation of said axle in a first direction exerts tractive force on the traction cable wire, release of said axle holds said traction cable wire in a selected position, and rotation of said axle in a second direction releases said tractive force.

23. A clutch actuator for an ergonomic support assembly comprising:
   a load bearing element disposed within a housing to be attachable to a load;
   a force application element disposed within said housing and disposed in force applying relation to a portion of said load bearing element to apply or release force against the load; and
   a stop assembly having a retainer fixed within said housing, said retainer retaining a stopper between a portion of said load bearing element and portion of said force application element, said stopper being dimensioned relative to said retainer and to said load bearing element to stop movement of said load bearing element relative to said retainer in the absence of a force application, and said stopper being dimensioned relative to said retainer and to said load bearing element to allow movement of said load bearing element relative to said retainer when force is applied against the load or when is force is released toward the load;
   wherein said retainer is a metal ring in said housing, said ring having an axis and having an inner surface engaged with said stopper, said inner surface having at least one groove;
   a traction linkage in operative engagement with said load bearing element and said housing at a first end, and said fraction linkage having a second end;
   a moveable ergonomic support in operative engagement with said second end of said fraction linkage, said moveable ergonomic support being moveable through a range of selectable positions and said ergonomic support bearing a load;
   whereby said ergonomic support is moved to a selected position through application of force by said force application element, held at said selected position by said stopper and returned from said selected position by release of force by said force application element.

* * * * *